US012560566B2

(12) United States Patent
Tan et al.

(10) Patent No.: US 12,560,566 B2
(45) Date of Patent: Feb. 24, 2026

(54) AUTOMATED TEMPERATURE COMPENSATION METHOD, APPARATUS AND STORAGE MEDIUM

(71) Applicants: SHENZHEN TECHNOLOGY INSTITUTE OF URBAN PUBLIC SAFETY, Shenzhen (CN); SHENZHEN SCIENCE AND TECHNOLOGY INSTITUTE OF URBAN SAFETY DEVELOPMENT, Shenzhen (CN)

(72) Inventors: Zhisen Tan, Shenzhen (CN); Nan Jin, Shenzhen (CN); Zhongqi Shi, Shenzhen (CN); Qingrui Yue, Shenzhen (CN); Hong Fan, Shenzhen (CN); Yanbing Zhou, Shenzhen (CN)

(73) Assignees: SHENZHEN TECHNOLOGY INSTITUTE OF URBAN PUBLIC SAFETY, Shenzhen (CN); SHENZHEN SCIENCE AND TECHNOLOGY INSTITUTE OF URBAN SAFETY DEVELOPMENT, Shenzhen (CN)

( * ) Notice: Subject to any disclaimer, the term of this patent is extended or adjusted under 35 U.S.C. 154(b) by 0 days.

(21) Appl. No.: 19/258,831

(22) Filed: Jul. 2, 2025

(65) Prior Publication Data

US 2025/0327765 A1      Oct. 23, 2025

Related U.S. Application Data

(63) Continuation of application No. PCT/CN2024/105092, filed on Jul. 12, 2024.

(30) Foreign Application Priority Data

Dec. 1, 2023    (CN) ......................... 202311632091.6

(51) Int. Cl.
*G01N 27/02* (2006.01)

(52) U.S. Cl.
CPC .................................. *G01N 27/028* (2013.01)

(58) Field of Classification Search
CPC ............................ G01N 27/08; G01N 27/028
See application file for complete search history.

(56) References Cited

U.S. PATENT DOCUMENTS 5,460,049 A      10/1995  Kirsch
2008/0231294 A1    9/2008  You et al.
(Continued)

FOREIGN PATENT DOCUMENTS

CN        108663411 A      10/2018
CN        108803761 A      11/2018
(Continued)

OTHER PUBLICATIONS

Chen Xuefeng et al., "Prospects for Damage Identification and Health Monitoring of Composite Material" Journal of Vibration , Measurement & Diagnosis, vol. 38 No. 1 Feb. 2018.
(Continued)

*Primary Examiner* — Alesa Allgood
(74) *Attorney, Agent, or Firm* — Fideli Law PLLC; Qiang Li

(57) ABSTRACT

Disclosed are an automated temperature compensation method, an apparatus and a storage medium. The present application obtains an impedance information set collected from at least one position of an object to be measured; determines n error values corresponding to the first impedance signal object according to a first impedance signal, n preset offsets and a pre-obtained reference signal, and determines a final error value according to the n error values and a preset standard; determines a horizontal compensation impedance signal according to the offset corresponding to (Continued)

obtaining an impedance signal set collected from at least one position of an object to be measured — S101 determining n error values corresponding to a first impedance signal according to the first impedance signal, n preset offsets and a pre-obtained reference signal — S102 determining a final error value according to the n error values and a preset standard — S103 determining a horizontal compensation impedance signal according to an offset corresponding to the final error value and the first impedance signal — S104 determining a vertical compensation impedance signal according to the reference signal, the horizontal compensation impedance signal and a temperature deviation coefficient — S105 the final error value and the first impedance signal, and determines a vertical compensation impedance signal according to the reference signal, the horizontal compensation impedance signal and the temperature deviation coefficient.

9 Claims, 8 Drawing Sheets

(56) References Cited

U.S. PATENT DOCUMENTS

| | | | |
|---|---|---|---|
| 2011/0040496 A1 | 2/2011 | Banerjee | |
| 2025/0035576 A1* | 1/2025 | Du | G01N 33/80 |

FOREIGN PATENT DOCUMENTS

| CN | 110895258 A | 3/2020 |
|---|---|---|
| CN | 211426351 U | 9/2020 |
| CN | 113092531 A | 7/2021 |
| CN | 113532654 A | 10/2021 |
| CN | 115684294 A | 2/2023 |
| CN | 115791891 A | 3/2023 |
| CN | 117330604 A | 1/2024 |
| CN | 117332205 A | 1/2024 |
| JP | S61112971 A | 5/1986 |
| KR | 20180085535 A | 7/2018 |
| WO | 2008157694 A2 | 12/2008 |

OTHER PUBLICATIONS

Han Fang et al., "Damage Detection for Timber Beams Based on Piezoelectric Impedance Technology" Piezoelectrics &. Acoustooptics, vol. 42 No. 4 Aug. 2020.

Zhan Yanglei et al., "Detection of Bolt Looseness Damage under Changing Temperature Condition by using EMI Method" Mechanical Science and Technology for Aerospace Engineering, vol. 38 No. 6 Jun. 2019.

The First Office Action for China Application No. 202311632091.6, Jan. 6, 2024.

The Notice of Grant for China Application No. 202311632091.6, Feb. 26, 2024.

Yang Jingwen et al., "Temperature Compensation Research of Damage Detection Technology Based on EMI Method" Journal of Civil Engineering and Management, vol. 31 No. 3 Sep. 2014.

International Search Report and Written Opinion in PCT/CN2024/105092 mailed on Oct. 31, 2024, 16 pages.

* cited by examiner

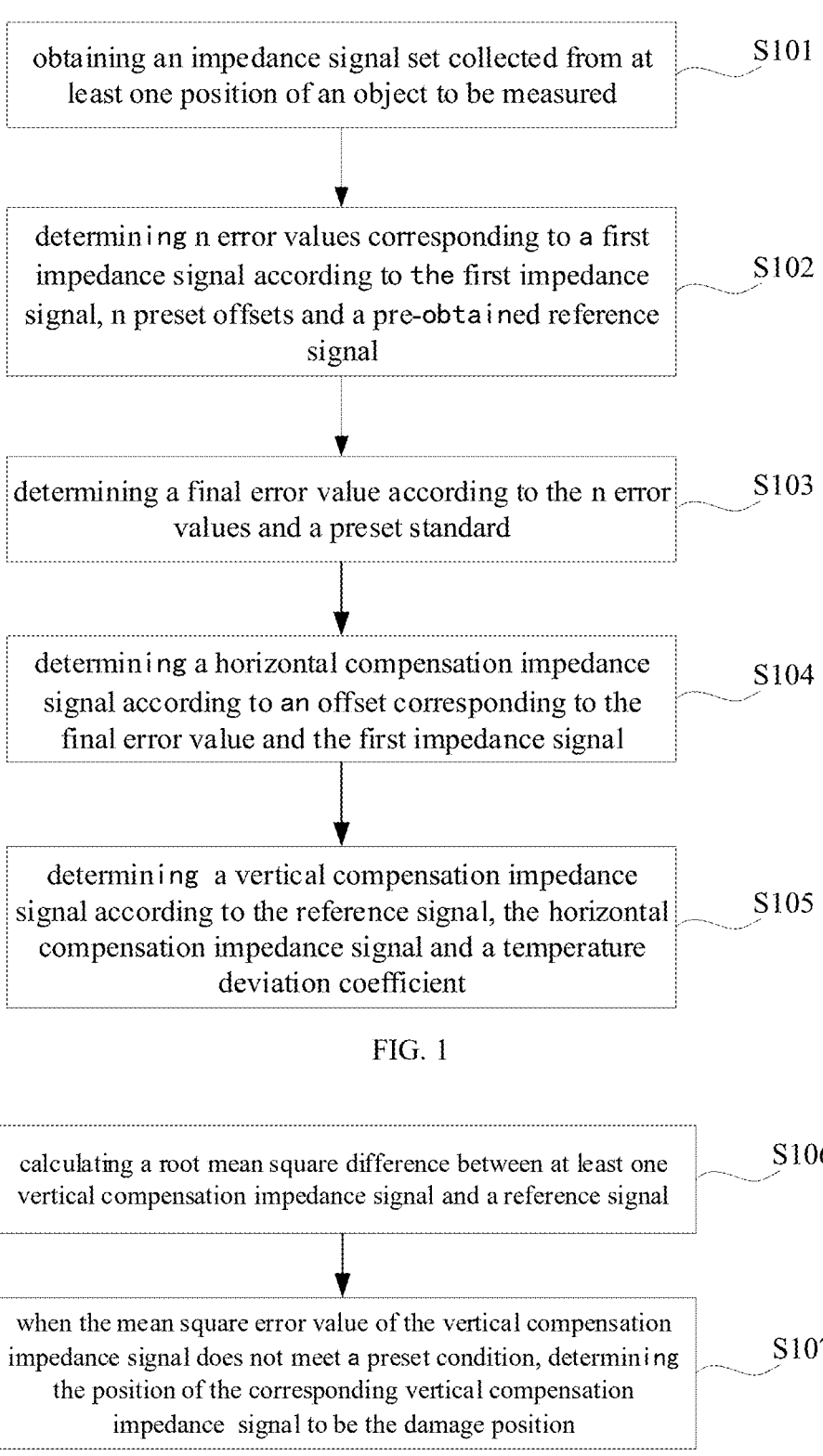

obtaining an impedance signal set collected from at least one position of an object to be measured — S101 determining n error values corresponding to a first impedance signal according to the first impedance signal, n preset offsets and a pre-obtained reference signal — S102 determining a final error value according to the n error values and a preset standard — S103 determining a horizontal compensation impedance signal according to an offset corresponding to the final error value and the first impedance signal — S104 determining a vertical compensation impedance signal according to the reference signal, the horizontal compensation impedance signal and a temperature deviation coefficient — S105

FIG. 1 calculating a root mean square difference between at least one vertical compensation impedance signal and a reference signal — S106 when the mean square error value of the vertical compensation impedance signal does not meet a preset condition, determining the position of the corresponding vertical compensation impedance signal to be the damage position — S107

FIG. 2

| | |
|---|---|
| multi-channel impedance measurement module<br><br>+<br><br>microcontroller module | multi-point impedance acquisition system of the structure → | collects the impedance reference signals of all measurement channels<br><br>continuously collects the impedance signals of all monitoring points |
| | effective frequency shift automated temperature compensation method → | automatically performs temperature compensation on the impedance signal |
| | multi-point damage monitoring method of the piezoresistive impedance structure → | locates and identifies minor damage<br><br>quantifies the degree of damage |

FIG. 4

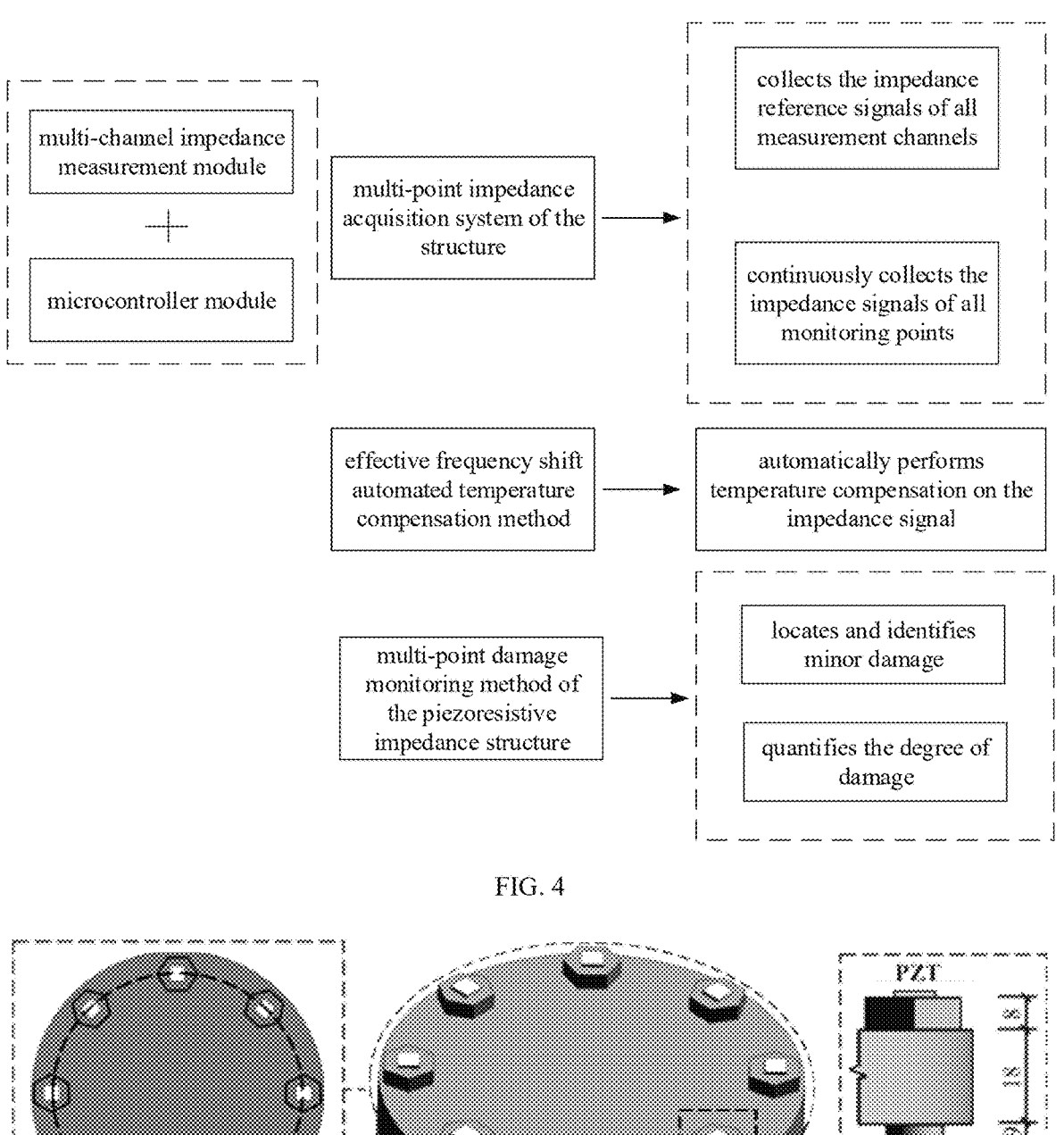

FIG. 5

AUTOMATED TEMPERATURE COMPENSATION METHOD, APPARATUS AND STORAGE MEDIUM

CROSS-REFERENCE TO RELATED APPLICATIONS

This application is a continuation application of International Application No. PCT/CN2024/105092, filed on Jul. 12, 2024, which claims priority to Chinese Patent Application No. 202311632091.6, filed on Dec. 1, 2023. The disclosures of the above-mentioned applications are incorporated herein by reference in their entireties.

TECHNICAL FIELD

The present application relates to the technical field of structural health monitoring, and in particular to an automated temperature compensation method, an apparatus and a storage medium.

BACKGROUND

The electromechanical impedance technology monitors the safety and damage state changes of a structure by detecting changes in the impedance signal of the object to be measured, exhibiting high sensitivity to early-stage micro-damage in the structure.

However, as the actual ambient temperature continuously changes, the amplitude and horizontal frequency of the impedance signal will change significantly, resulting in the impedance signal changes caused by changes in the structural damage state may be submerged in the impedance signal changes caused by temperature changes, which in turn causes interference, inaccuracy, and even misjudgment of the monitoring results of structural safety state.

Most of the related arts use the effective frequency shift method for temperature compensation, but this technology rarely considers the frequency difference of the amplitude deviation, resulting in the limitation of the impedance compensation accuracy of the effective frequency shift method.

SUMMARY

The main purpose of the present application is to provide an automated temperature compensation method, an apparatus and a storage medium, aiming to solve the problems mentioned above.

According to a first aspect, the present application provides an automated temperature compensation method, including:

obtaining an impedance signal set collected from at least one position of an object to be measured;

determining n error values corresponding to a first impedance signal according to the first impedance signal, n preset offsets and a pre-obtained reference signal, the first impedance signal is any one of signals in the impedance signal set collected from the at least one position;

determining a final error value according to the n error values and a preset standard;

determining a horizontal compensation impedance signal according to an offset corresponding to the final error value and the first impedance signal; and determining a vertical compensation impedance signal according to the reference signal, the horizontal compensation impedance signal and a temperature deviation coefficient, the temperature deviation coefficient is calculated according to the reference signal and the first impedance signal.

According to a first aspect, the present application provides an automated temperature compensation apparatus, applied to an electronic device, the electronic device includes: a memory and a processor, the memory is communicatively connected to the processor, the memory stores computer instructions, the apparatus includes:

an obtainment module, configured to obtain an impedance signal set collected from at least one position of the object to be measured;

a first error determination module, configured to determine n error values corresponding to a first impedance signal according to the first impedance signal, n preset offsets, and a pre-obtained reference signal, the first impedance signal is any one of the impedance signal sets collected from the at least one position;

a second error determination module, configured to determine a final error value according to the n error values and a preset standard;

a first compensation signal determination module, configured to determine a horizontal compensation impedance signal according to an offset corresponding to the final error value and the first impedance signal; and a second compensation signal determination module, configured to determine a vertical compensation impedance signal according to the reference signal, the horizontal compensation impedance signal and a temperature deviation coefficient, the temperature deviation coefficient is calculated according to the reference signal and the first impedance signal.

According to a third aspect, the present application provides a non-transitory computer-readable storage medium, the computer-readable storage medium stores computer instructions, and the computer instructions are configured such that the automated temperature compensation method according to the first aspect is executed by a computer.

BRIEF DESCRIPTION OF THE DRAWINGS

In order to more clearly illustrate the embodiments of the present application or the technical solutions in the related art, the drawings required for use in the embodiments or the description of the related art will be briefly introduced below. Obviously, the drawings described below are only some embodiments of the present application. For those skilled in the art other drawings can be obtained based on the structures shown in these drawings without creative work.

FIG. 1 is a flowchart of an automated temperature compensation method according to an embodiment of the present application.

FIG. 2 is a flowchart of the automated temperature compensation method according to an embodiment of the present application.

FIG. 4 is a schematic diagram of a multi-point damage monitoring system according to an embodiment of the present application.

FIG. 5 is a schematic diagram of a flange structure and bolts thereon are used for impedance signal monitoring test in outdoor environment with temperature changes according to an embodiment of the present application.

DETAILED DESCRIPTION OF THE EMBODIMENTS

Figure 3:
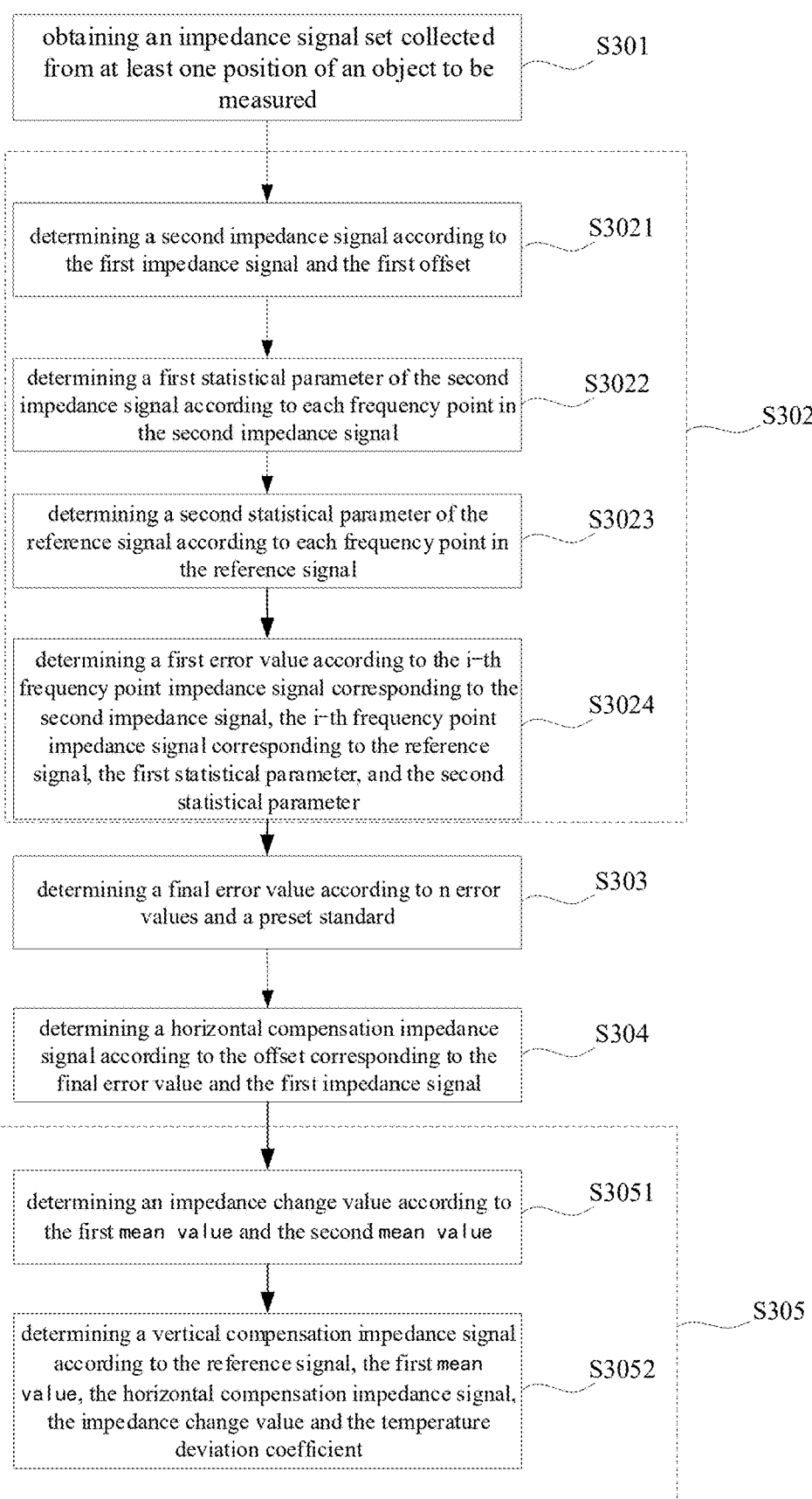
FIG. 3 is a flowchart of the automated temperature compensation method according to an embodiment of the present application.

In order to make the purpose, technical solution and advantages of the embodiments of the present application clearer, the technical solution in the embodiments of the present application will be clearly and completely described below in conjunction with the drawings in the embodiments of the present application. Obviously, the described embodiments are part of the embodiments of the present application, not all of the embodiments. Based on the embodiments in the present application, all other embodiments obtained by those skilled in the art without creative work are within the scope of protection of the present application.

According to an embodiment of the present application, an embodiment of an automated temperature compensation method is provided. It should be noted that the steps shown in the flowchart of the accompanying drawings can be executed in a computer system such as a set of computer executable instructions, and although a logical order is shown in the flowchart, in some cases, the steps shown or described can be executed in an order different from that shown here.

Piezoresistive impedance technology monitors the safety and damage state changes of a structure by detecting changes in the impedance signal of the object to be measured, exhibiting high sensitivity to early-stage micro-damage in the structure. The piezoresistive impedance technology is simple to implement, can be applied to complex structures, and the required sensors are cheap, light, small, high in conversion efficiency, and good in long-term stability. Therefore, piezoresistive impedance technology is considered to be one of the most promising structural non-destructive testing technologies in the field of structural health monitoring.

In structural damage monitoring applications based on electromechanical impedance (EMI) technology, a critical problem arises: with the continuous change of actual ambient temperature, the amplitude and horizontal frequency of the impedance signal will change greatly, resulting in the damage-induced impedance signal variation may be overshadowed by the temperature-induced impedance signal variation, thereby causing the monitoring results of the structural safety statue to be disturbed, inaccurate or even misjudged. Therefore, compensating for the temperature effect of the measured impedance signal is of great significance to promote the application of piezoelectric impedance technology in practical engineering.

In order to perform temperature compensation on the piezoelectric impedance signal, scholars at home and abroad have proposed various temperature compensation techniques, such as temperature compensation technology based on neural network, effective frequency shift method, compensation method based on linear fitting, and compensation method based on cointegration. The effective frequency shift method has been widely used due to its advantages of simple calculation and concise principle. The effective frequency shift (EFS) method based on the mutual correlation coefficient performs overall translation compensation on the impedance signal in the horizontal direction by finding the frequency offset under the maximum value of the mutual correlation coefficient, and compensates the impedance signal for amplitude deviation based on the difference in mean value on the vertical direction, which is equivalent to equal amplitude compensation for the impedance signal of all frequencies. However, studies have shown that the vertical amplitude deviation of the impedance signal caused by temperature will change with the change of frequency. That is, the error amplitude deviation values generated in the low-frequency interval and the high-frequency interval are different. At present, in the temperature compensation research based on the effective frequency shift method, there is little consideration of the frequency difference of the amplitude deviation, which limits the impedance compensation accuracy of the effective frequency shift method.

Based on the above problems, an automated temperature compensation method is provided in the embodiment, and FIG. 1 is a flowchart of the automated temperature compensation method according to the embodiment of the present application. The automated temperature compensation method in the embodiment of the present application can be applied to a multi-point damage monitoring system in a temperature-changing environment, the multi-point damage monitoring system includes a multi-channel impedance measurement module and a microcontroller module.

The multi-channel impedance measurement module includes multiple monitoring channels, and the piezoelectric sensor is attached to multiple monitoring points of the object to be measured. Specifically, the multi-channel impedance measurement module includes an impedance measurement AD5933 chip, a #1 low-voltage multiplexer, a #2 low-voltage multiplexer, a #3 low-voltage multiplexer, a calibration resistor network, a feedback resistor network, and a measurement channel network. The impedance measurement module realizes the impedance measurement function based on the AD5933 chip. Based on the #1 low-voltage multiplexer, the calibration resistor network can be controlled to switch. Based on the #2 low-voltage multiplexer, the feedback resistor network can be controlled to switch. Based on the #3 low-voltage multiplexer, multiple measurement channels can be controlled to switch, so as to realize impedance signal acquisition at multiple monitoring points of the object to be measured.

The microcontroller module controls the impedance measurement module based on the STM32 chip. Based on the control of the #1 low-voltage multiplexer and the #2 low-voltage multiplexer, the calibration resistor and feedback resistor used in the measurement are selected respectively. Based on the control of the #3 low-voltage multiplexer, the impedance signal acquisition and switching of multiple monitoring points of the object to be measured can be realized.

As shown in FIG. 1, the process of the automated temperature compensation method includes the following steps:

Step S101, obtaining an impedance signal set collected from at least one position of the object to be measured;

Step S102, determining n error values corresponding to a first impedance signal according to the first impedance signal, n preset offsets and a pre-obtained reference signal.

The first impedance signal is any one of signals in the impedance signal set collected from the at least one position.

In an embodiment, an impedance signal set collected from at least one position of the object to be measured is obtained through a multi-channel impedance measurement module. After the impedance signal set is obtained, in order to avoid the influence of the temperature change of the environment in which the object to be measured is located on the impedance signal, it is necessary to perform temperature compensation on the impedance signal. The reference signal is the impedance signal of the object to be measured in a healthy state.

Before performing temperature compensation on the impedance signal, it is necessary to perform horizontal compensation on the impedance signal. Specifically, by calculating the CC value (error value) between the impedance signal $s^t_{(\Delta\omega i)}$ after temperature change with different frequency offsets $\Delta\omega_i$ and the initial reference signal $S^0$.

In an embodiment, the frequency offset $\Delta\omega$ when the CC calculation value is maximum is selected to perform horizontal compensation.

The frequency offset $\Delta\omega$ is determined as follows:

$$\Delta\omega_n = n \times \Delta f, n = 1, 2, \ldots, m$$

$\Delta f$ represents the frequency sweep step length, which is the frequency sweep step length corresponding to the acquired impedance signal.

Step S103, determining a final error value according to the n error values and a preset standard.

Step S104, determining a horizontal compensation impedance signal according to the offset corresponding to the final error value and the first impedance signal.

In an embodiment, after the final error value is determined, the horizontal compensation impedance signal is determined according to the offset corresponding to the final error value and the first impedance signal. Specifically, when the ambient temperature changes by $\Delta T$, the calculation formula of the impedance data $S^T$ after horizontal frequency shift compensation is as follows:

$$S^T = S^t(\omega + \text{sgn}(\Delta T) \times \Delta\omega)$$

$S^T$ is the horizontal compensation impedance signal, $S^t$ is the first impedance signal, $\Delta T$ is the temperature change value, and $\Delta\omega$ is the offset corresponding to the final error value.

Step S105, determining the vertical compensation impedance signal according to the reference signal, the horizontal compensation impedance signal and the temperature deviation coefficient, the temperature deviation coefficient is calculated according to the reference signal and the first impedance signal.

In an embodiment, after determining the horizontal compensation impedance signal, the vertical compensation impedance signal is determined based on the horizontal compensation impedance signal, the reference signal and the temperature deviation coefficient. The vertical compensation impedance signal is the value closest to the real impedance signal, and the vertical compensation signal is obtained by considering the impact of temperature changes on the impedance signal, as well as the impact on the frequency amplitude, thereby improving the accuracy of the impedance signal and improving the accuracy of the judgment of the degree of damage to the object to be measured.

The mean value of the amplitude deviation rate signal $S^{TR}$ is selected as the TR parameter, and the calculation formula of the complex admittance $\overline{Y}$ is as follows:

$$\overline{Y} = G + Bj = \omega j \frac{w_a l_a}{h_a}\left[\overline{\varepsilon^T_{33}} + \left(\frac{Z_a}{Z_s + Z_a}\right)d^2_{31}\overline{Y^E_{22}}\left(\frac{\tan \kappa l_a}{\kappa l_a}\right) - d^2_{31}\overline{Y^E_{22}}\right]$$
$$\kappa = \omega/c^E t$$

$\omega$ represents the angular frequency; $w_a$ is the width of the piezoelectric sensor, $l_a$ is the length of the piezoelectric sensor, and $h_a$ is the thickness of the piezoelectric sensor;

$$\overline{\varepsilon^T_{33}}$$

represents the complex dielectric constant of the piezoelectric sensor under constant stress state; $Z_a$ represents the mechanical impedance of the piezoelectric sensor, and $Z_s$ represents the mechanical impedance of the main structure; $d_{31}$ represents the strain constant of the piezoelectric sensor;

$$\overline{Y^E_{22}}$$

represents the complex Young's modulus of the piezoelectric sensor under constant electric field; $\kappa$ is the wave number; $c^E t$ is the wave velocity; G represents the real parts of the admittance $\overline{Y}$ and B represents imaginary parts of the complex admittance $\overline{Y}$.

To simplify the expression, the following notation is defined:

$$C = \frac{w_a l_a}{h_a}\left[\overline{\varepsilon_{33}^T} + \left(\frac{Z_a}{Z_s + Z_a}\right)d_{31}^2 \overline{Y_{22}^E}\left(\frac{\tan \kappa l_a}{\kappa l_a}\right) - d_{31}^2 \overline{Y_{22}^E}\right]$$

Then the complex admittance $\overline{Y}$ can be expressed as:

$$\overline{Y} = \omega j C$$

That is, the amplitude deviation rate signal $S^{TR}$ is as follows:

$$S^{TR} = \frac{\overline{Y_0} - \overline{Y_T}}{\overline{Y_T}} = \frac{\omega j C - \omega j C'}{\omega j C'} = \frac{C - C'}{C} = 1 - \frac{C'}{C}$$

$\overline{Y_T}$ is the complex admittance after temperature change, and $\overline{Y0}$ is the complex admittance under the reference state. It can be seen from the $S^{TR}$ expression that its variables are C and C'.

To simplify the expression, the following notation is defined:

$$f(C', C) = S^{TR} = 1 - \frac{C'}{C}$$

The rationality of taking the mean value of the amplitude deviation rate signal $S^{TR}$ as the compensation TR value, it is only necessary to prove that $S^{TR}$ does not change with frequency or changes very little with frequency, and then it can be proved that taking its mean value in the frequency domain as the compensation TR value has no error or has very little error. That is, it needs to be proved that:

$$\frac{\partial f(C', C)}{\partial \omega} = 0$$

According to multivariable chain rule:

$$\frac{\partial f(C', C)}{\partial \omega} = \frac{\partial f(C', C)}{\partial C'} \times \frac{\partial C'}{\partial \omega} + \frac{\partial f(C', C)}{\partial C} \times \frac{\partial C}{\partial \omega}$$

Variables that affect C include $w_a$, $l_a$, $h_a$, $$\frac{Z_a}{Z_s + Z_a}, \frac{\tan \kappa l_a}{\kappa l_a}, \overline{\varepsilon_{33}^T}, \overline{Y_{22}^E},$$

$d_{31}$, so we can get:

$$\frac{\partial C}{\partial \omega} = \frac{\partial C}{\partial w_a} \times \frac{\partial w_a}{\partial \omega} + \frac{\partial C}{\partial l_a} \times \frac{\partial l_a}{\partial \omega} + \frac{\partial C}{\partial h_a} \times \frac{\partial h_a}{\partial \omega} + \dots + \frac{\partial C}{\partial d_{31}} \times \frac{\partial d_{31}}{\partial \omega}$$

According to the above formula, the physical dimensions ($w_a$, $l_a$ and $h_a$) of the piezoelectric sensor are independent of the frequency $\omega$, that is $$\frac{\partial w_a}{\partial \omega} = \frac{\partial l_a}{\partial \omega} = \frac{\partial h_a}{\partial \omega} = 0; \text{ for } \frac{Z_a}{Z_s + Z_a}, Z_a = -j\frac{\overline{K_a}\kappa l_a}{\omega \tan(\kappa l_a)},$$

the impedance of the rectangular main structure $$Z_s = \frac{K_s}{j\omega},$$

it can be seen from the expression that $Z_a$ and $Z_s$ are inversely proportional functions of the frequency $\omega$, and therefore, $$\frac{Z_a}{Z_s + Z_a}$$

is independent of the angular frequency $\omega$, that is $$\frac{\partial (Z_a/(Z_a + Z_s))}{\partial \omega} = 0;$$

when $\kappa l_a = (\omega \times l_a)/c^E t$ is small, that is, the frequency $\omega$ or the length of the sensor $l_a$ is small, then $(\tan \kappa l_a/\kappa l_a) \approx 1$, which means that $\tan \kappa l_a/\kappa l_a$ will not change with frequency $$\left(\frac{\partial (\tan \kappa l_a/\kappa l_a)}{\partial \omega} = 0\right);$$

the complex dielectric constant $$\overline{\varepsilon_{33}^T},$$

complex Young's modulus $$\overline{Y_{22}^E}$$

and strain constant $d_{31}$ of the piezoelectric sensor are all inherent properties of the material and do not change with the external excitation frequency, therefore $$\frac{\partial (\overline{\varepsilon_{33}^T})}{\partial \omega} = \frac{\partial (\overline{Y_{22}^E})}{\partial \omega} = \frac{\partial (d_{31})}{\partial \omega} = 0.$$

In summary, when the frequency $\omega$ or the length of the sensor $l_a$ is small and satisfies $(\tan \kappa l_a/\kappa l_a) \approx 1$, $$\frac{\partial C}{\partial \omega} = 0,$$

and it can be verified that 9                                                          10

$$\frac{\partial C'}{\partial \omega} = 0,$$

we can substitute it into formula (5.20) to obtain:

$$\frac{\partial f(C', C)}{\partial \omega} = \frac{\partial f(C', C)}{\partial C'} \times 0 + \frac{\partial f(C', C)}{\partial C} \times 0 = 0$$

It is reasonable to use the mean value of the amplitude deviation rate signal $S^{TR}$ as the initial value of the compensation TR parameter.

In the automated temperature compensation method provided in the present embodiment, an impedance signal set collected from at least one position of the object to be measured is obtained; n error values of the first impedance signal object are determined according to the first impedance signal, n preset offsets and a pre-obtained reference signal, and a final error value according to the n error values and a preset standard are determined, thereby determining different offsets corresponding to different temperature changes and determining an accurate final compensation value for the current object to be measured. On this basis, a horizontal compensation impedance signal is determined according to the offset corresponding to the final error value and the first impedance signal, and the horizontal compensation of the impedance signal is completed. Next, a vertical compensation impedance signal is determined according to the reference signal, the horizontal compensation impedance signal and the temperature deviation coefficient, and differentiated compensation in the vertical direction is performed, thereby improving the accuracy of the impedance signal.

In the embodiment, an automated temperature compensation method is provided, as shown in FIG. 2, after the Step S105, the automated temperature compensation method further includes the following steps:

Step S106, calculating a root mean square deviation between at least one vertical compensation impedance signal and a reference signal; and Step S107, in response to that the root mean square deviation value of the vertical compensation impedance signal does not meet a preset condition, determining the position of the corresponding vertical compensation impedance signal to be the damage position.

For example, after compensating the collected impedance signal, the root mean square deviation between the at least one vertical compensation impedance signal and the reference signal is calculated, the position of the object to be measured that is damaged can be accurately determined based on the root mean square deviation, and corresponding countermeasures can be determined later.

The calculation formula of the root mean square deviation (RMSD) is as follows:

$$RMSD_{i,x} = \sqrt{\frac{\sum_{n=1}^{N} (S_{i,x} - S_{i,ref})^2}{\sum_{n=1}^{N} (S_{i,ref})^2}}$$

$S_{i,ref}$ represents the reference signal of the i-th monitoring point, $S_{i,x}$ represents the impedance signal collected at the i-th monitoring point when the damage degree is x, x represents different damage degrees.

In an embodiment, after the Step S107, the automated temperature compensation method further includes:

continuously obtaining the impedance signal at the damage position; and continuously monitoring the damage position according to the impedance signal at the damage position.

For example, after determining the damage position, the position of early minor damage can be identified based on the damage position, and the RMSD value changes of the damaged position can be continuously monitored. By continuously monitoring the changes in RMSD of the damaged position, the relative looseness of the bolt from the occurrence of initial damage to complete loosening and detachment can be monitored.

In the embodiment, an automated temperature compensation method is provided, as shown in FIG. 3, the automated temperature compensation method includes the following steps:

Step S301, obtaining an impedance signal set collected from at least one position of the object to be measured.

Please refer to S101 of the embodiment shown in FIG. 1 for details, which will not be described in detail here.

Step S302, determining n error values corresponding to a first impedance signal according to the first impedance signal, n preset offsets and a pre-obtained reference signal, the first impedance signal is any one of the impedance signal sets collected from the at least one position.

Step S303, determining a final error value according to n error values and a preset standard.

Step S304, determining a horizontal compensation impedance signal according to the offset corresponding to the final error value and the first impedance signal.

Step S305, determining the vertical compensation impedance signal according to the reference signal, the horizontal compensation impedance signal and the temperature deviation coefficient, the temperature deviation coefficient is calculated according to the reference signal and the first impedance signal.

The first impedance signal and the reference signal both include m frequency points. In an embodiment, the S302 includes the following steps:

Step S3021, determining a second impedance signal according to the first impedance signal and the first offset.

The first offset is any one of the n preset offsets.

In an embodiment, the collected impedance signals are calculated with the corresponding n offsets respectively to obtain corresponding n second impedance signals, the n second impedance signals represent impedance signals that are compensated with different frequency shifts.

Step S3022, determining a first statistical parameter of the second impedance signal according to each frequency point in the second impedance signal;

Step S3023, determining a second statistical parameter of the reference signal according to each frequency point in the reference signal.

In an embodiment, when collecting impedance signals and reference signals, there are m corresponding frequency points for collection. Therefore, the first statistical parameter of the second impedance signal and the second statistical parameter of the reference signal can be determined based on the impedance signal collected at each frequency point, the first statistical parameter includes the standard deviation and the mean value, and the second statistical parameter includes the standard deviation and the mean value.

The calculation formula of the mean value of the second impedance signal is as follows:

$$\overline{S^t} = \frac{\sum_{i=1}^{m} S_i^t}{m}$$

$S_i^t$ represents the impedance signal at the i-th frequency point after the temperature changes, $\overline{S^t}$ represents the mean value of the second impedance signal after the temperature changes, and m is the quantity of frequency points.

The calculation formula of mean value of the reference signal is as follows:

$$\overline{S_0} = \frac{\sum_{i=1}^{m} S_i^0}{m}$$

$$S_i^0$$

represents the reference signal at the i-th frequency point at the reference temperature, $\overline{S_0}$ represents the mean value of the reference signal at the reference temperature, and m is the quantity of frequency points.

Step S3024, determining a first error value according to the i-th frequency point impedance signal corresponding to the second impedance signal, the i-th frequency point impedance signal corresponding to the reference signal, the first statistical parameter, and the second statistical parameter.

In an embodiment, the first error value is calculated by the following formula:

$$CC(S^t, S^0) = \sum_{i=1}^{m} \frac{(S_i^t - \overline{S^t})(S_i^0 - \overline{S^0})}{\sigma_1 \sigma_0}$$

m is the quantity of frequency points, $S_i^t$ represents the impedance signal at the i-th frequency point after the temperature change, $\overline{s^t}$ represents the mean value of the impedance signal after the temperature change, $$S_i^0$$

represents the impedance signal at the i-th frequency point at the reference temperature, $\overline{S^0}$ represents the mean value of the reference signal at the reference temperature, $\sigma 1$ represents the standard deviation of the impedance signal after the temperature change, $\sigma 0$ represents the standard deviation of the impedance signal at the reference temperature, and $CC(S^t, S^0)$ is the first error value.

In an embodiment, the S305 includes the following steps:

Step S3051, determining an impedance change value according to the first mean value and the second mean value; and Step S3052, determining a vertical compensation impedance signal according to the reference signal, the first mean value, the horizontal compensation impedance signal, the impedance change value and the temperature deviation coefficient.

In an embodiment, the corresponding impedance change value is determined by the following formula:

$$\Delta S = \overline{S_0} - \overline{S^T}$$

$\overline{S_0}$ is the first mean value, $\overline{S^T}$ is the mean value of the horizontal compensation impedance signal after the temperature changes, and $\Delta S$ is the impedance change value.

The vertical compensation impedance signal is calculated by the following formula:

$$S' = (S^0 - \overline{S_0}) \times TR + (S^T + \Delta S)$$

$S^0$ is the reference signal, $\overline{S_0}$ is the first mean value, TR is the temperature deviation coefficient, $S^T$ is the horizontal compensation impedance signal, and $\Delta S$ is the impedance change value.

The temperature deviation coefficient is determined according to the following steps: determining the initial temperature deviation coefficient according to the reference signal, the horizontal compensation impedance signal and the quantity of frequency points; and optimizing the initial temperature deviation coefficient to determine the temperature deviation coefficient.

In an embodiment, the initial temperature deviation coefficient is determined according to the amplitude deviation between the horizontal compensation impedance signal and the reference signal. Specifically, the initial temperature deviation coefficient is calculated by the following formula:

$$S^{TR} = \frac{S^0 - S^T}{S^0}$$

$$TR_0 = \frac{\sum_{i=1}^{m} S^{TR}}{m}$$

$S^{TR}$ is the amplitude deviation rate signal.

In an embodiment, the step of optimizing the initial temperature deviation coefficient to determine the temperature deviation coefficient includes:

Step a1, determining a first temperature deviation coefficient and a second temperature deviation coefficient according to the initial temperature deviation coefficient, a first preset random number, and a second preset random number, the first temperature deviation coefficient is less than the initial temperature deviation coefficient and less than the second temperature deviation coefficient, and the first preset random number is less than the second preset random number.

Step a2, respectively determining a first relative error value corresponding to the initial temperature deviation coefficient, a second relative error value corresponding to the first temperature deviation coefficient, and a third relative error value corresponding to the second temperature deviation coefficient.

In an embodiment, on the basis of obtaining the initial temperature deviation coefficient $TR_0$, an iterative search is performed to obtain a suitable value of the temperature deviation coefficient TR, the steps are as follows:

Step 1, initializing and generating random numbers.

The random numbers such as:

$$C1 \in [-1, 0), C2 \in (0, 1];$$

$$t1 = TR0 + C1, e1 = f(t1);$$

$$t2 = TR0, e2 = f(t2);$$

$$t3 = TR0 + C2, e2 = f(t3).$$

f represents a relative error function with reference to the reference signal, the detailed expression of which is $f(t_1)=(S^0-\overline{S_0}) \times t_1 + (S^7 + \Delta S) - S^0$, C1 is a first preset random number, C2 is a second preset random number, and $TR_0$ is an initial temperature deviation coefficient. e1 is the first relative error value, e2 is the second relative error value, and e3 is the third relative error value.

Step a3, determining a first gradient value according to the first relative error value, the second relative error value and a first preset random number;

Step a4, determining a second gradient value according to the second relative error value, the third relative error value and a second preset random number.

Step 2, calculating the gradient.

$$g_1 = \frac{f_1 - f_2}{C_1}$$

$$g_2 = \frac{f_3 - f_2}{C_2}$$

g1 is the first gradient value, g2 is the second gradient value, $f_1$ is the first relative error value, $f_2$ is the second relative error value, $f_3$ is the third relative error value, C1 is the first preset random number, and C2 is the second preset random number.

Step a5, performing iterative optimization according to the first gradient value and the second gradient value to determine a temperature deviation coefficient.

Step 3, determining the sign of the advancing gradient.

```
if f1>0, f2<0;
t1=t2, t2=t3, e1=f(t1), e2=f(t2);
C2∈(0,1];
t3=t3+C2;
updating f2 and iterating until f2>0;
outputting TR=t2;
else if f1>0, f2>0;
comparing the absolute values of f1 and f2;
if f1<f2;
C1=-C1²;
t3=t2, t2=t2+C1, e3=f(t3), e2=f(t2);
updating C1 and iterating until f2<0;
outputting TR=x3;
else if f1>f2;
C2=C22;
t1=t2, t2=t2+C2, e1=f(t1), e2=f(t2);
updating C2 and iterating untilf1<0;
outputting TR=x1;
else if f1<0, f2>0;
t3=t2, t2=t1, e3=f(t3), e2=f(t2);
C1∈[-1,0);
t1=t1+C1;
updating f1 and iterating until f1>0;
outputting TR=t2.
```

The second-order partial derivative of the curve of temperature compensation error changing with TR parameter is greater than 0. There is no situation where (f1−f2)/c1<0 or (f3−f2)/c2<0. Therefore, this situation is not discussed in the iterative search.

As shown in FIG. 4, the multi-point damage monitoring system includes an effective frequency shift automated temperature compensation method (the automated temperature compensation method), a multi-point impedance acquisition system of the structure (multi-point damage monitoring system), and a multi-point damage monitoring method of the structure.

The multi-point impedance acquisition system of the structure has multiple monitoring channels. By attaching piezoelectric sensors to multiple monitoring points of the structure, the multi-point impedance acquisition system can realize impedance signal acquisition at multiple points of the structure.

The automated temperature compensation method can realize automated temperature compensation of the impedance signal collected by the multi-point impedance acquisition system of the structure by improving the compensation of the vertical amplitude deviation.

The multi-point damage monitoring method of the structure can identify the position of damage by analyzing the impedance signal acquired by the multi-point impedance acquisition system of the structure and calculating the RMSD between the impedance signal and a reference signal.

The effective frequency shift automated temperature compensation method can realize the frequency differential compensation of the vertical amplitude deviation of the impedance signal based on the TR parameter. The automatic value of the TR parameter can be determined by deriving the initial value formula of the TR parameter and combining it with the local optimization strategy.

Next, two embodiments are provided to verify and analyze the feasibility and accuracy of the above described embodiment.

First Embodiment

In the field of structural health monitoring, when using the piezoresistive impedance method for damage monitoring, a piezoelectric ceramic transducer (PZT) is generally first pasted on the object to be monitored, and then the PZT is connected to the impedance measurement device. After the impedance signal is acquired by using the impedance measurement device, the temperature effect of the impedance signal is first eliminated based on a specific temperature compensation method, and then the structural damage is identified by analyzing the RMSD value change of the impedance signal. The effect of temperature compensation directly affects the result of damage identification and is of great significance.

The traditional effective frequency shift method includes horizontal frequency shift compensation and amplitude deviation compensation for impedance signal. The appropriate frequency offset is determined by calculating the maximum correlation coefficient between the impedance signal and the reference signal, and then the impedance signal is used for an overall frequency shift to achieve horizontal frequency shift compensation. On the basis of horizontal frequency shift compensation, the impedance signal is further used for mean adjustment and normalization to achieve amplitude deviation compensation. The amplitude deviation compensation based on mean adjustment and normalization is equivalent to equal amplitude compensation for the impedance signal of all frequencies. The impedance amplitude deviation caused by temperature to impedance signals of different frequencies is different, and the absolute value of the amplitude deviation is related to the numerical distance between the signal modulus and the mean value. This inference indicates that it is inappropriate for the related art to perform equal amplitude compensation for the impedance signal of all frequencies. In order to perform differentiated amplitude deviation compensation for all frequencies, the embodiment improves the amplitude deviation compensation of the existing EFS method, proposes a TR parameter, and performs differential amplitude deviation compensation and differential frequency compensation for the impedance signal based on this parameter.

In order to test the temperature compensation performance and damage identification performance improvement effect of the automated temperature compensation method proposed in the present application and the related art in long-term monitoring of temperature change environment, as shown in FIG. 5, in the embodiment, the flange structure and the bolts thereon are used for impedance signal monitoring test in outdoor environment with temperature changes. The outdoor test includes two parts: temperature compensation performance verification test and damage identification performance improvement test. In the temperature compensation performance verification test, only one of the bolts is monitored. In the damage identification performance improvement test, all bolts are monitored. One of the bolts may become loose or become damage. The impedance measurement is performed by using the multi-point impedance acquisition system of the structure; the temperature is measured by using a temperature monitoring and recorder model TH40W, with a temperature resolution of 0.1° C.; the monitoring test is performed in an outdoor environment at No. 40 Hongshan Side Road, Wuchang District, Wuhan City, Hubei Province, China.

(1) Temperature Compensation Performance Verification Test

A temperature compensation performance verification test was carried out for 11 days from 2022 Nov. 29-03:40 to 2022 Dec. 10:08:00. The impedance and temperature data were synchronously collected and recorded, and the impedance signal was temperature compensated by using the related art and the automated temperature compensation method proposed in the present application.

Before the monitoring test, the torque of all bolts was controlled to 30N·m using a torque wrench. Then, the PZT sheets attached to the bolts were scanned over a wide frequency range from 10 Hz to 100 kHz. The frequency range from 75 kHz to 100 kHz was selected based on the frequency position of the resonance peak in the impedance modulus curve. Impedance calibration was performed using a 1 kΩ calibration resistor and impedance monitoring was carried out.

In order to compare the temperature compensation effect of the method proposed in the present application, the impedance signal at 11-29 03:40 (12.8° C.) is used as the benchmark data (hereinafter, the benchmark data refers to the impedance data at this moment), and the automated temperature compensation method is used to perform temperature compensation on the impedance signal obtained by subsequent monitoring. At the same time, the related art is used to perform temperature compensation on the impedance signals collected at different times. Finally, with the benchmark data as a reference, the compensation relative errors of the impedance data at different times in the two methods are calculated respectively. The average value of the compensation relative errors of temperature compensation at all monitoring moments in the two methods are calculated. The average value of the compensation relative errors of the improved effective frequency shift method is 0.26%, and the average value of the compensation relative errors of the related art is 0.44%, and the standard deviations of the compensation relative error of the improved effective frequency shift method is 0.017%, and the standard deviations of the compensation relative error of the related art is 0.097%. It can be seen that compared with the use of the related art, the improved effective frequency shift method can more effectively eliminate the influence of temperature on the impedance measurement results of the measurement system, and achieve superior temperature compensation accuracy and error stability.

Figure 6:
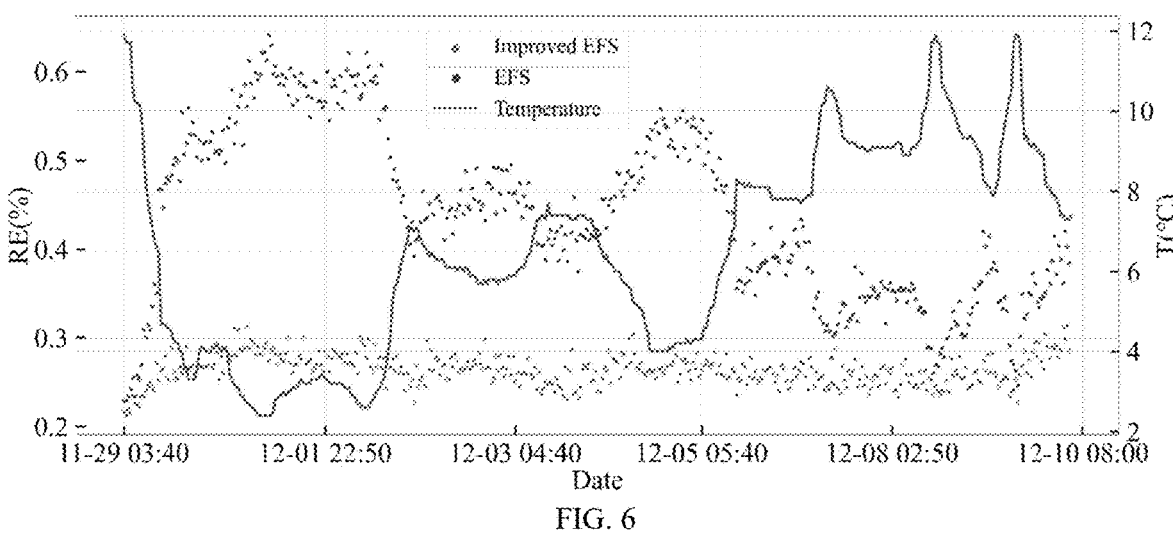
FIG. 6 is a schematic diagram of comparison results of compensation relative errors between the related art and the present application.
Figure 7:
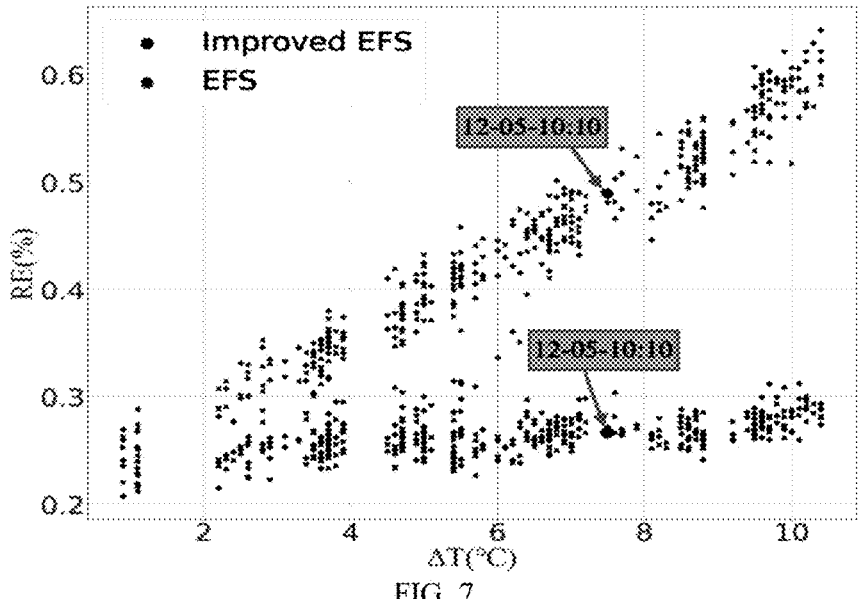
FIG. 7 is a schematic diagram of a calculation results of the scatter plot of compensation error with temperature difference according to an embodiment of the present application.

The compensation relative errors of the two methods at different times are compared, and the comparison results are shown in FIG. 6. The highest temperature during the monitoring period was 12.8° C., and the lowest temperature was 1.6° C. The change of ambient temperature during the test is shown by the solid line in FIG. 6. The average value of the compensation relative errors of the conventional method fluctuates greatly over time, and is approximately negatively correlated with the temperature change (when the temperature drops, the average value of the compensation relative error increases; when the temperature rises, the average value of the compensation relative error decreases). The scatter diagram (RE-ΔT) of the compensation relative error of the two methods with the temperature difference (ΔT) is further calculated and compared, where the calculation reference temperature of ΔT is 12.8° C., and the calculation results are shown in FIG. 7. It can be clearly seen from the FIG. 6 that the compensation relative error of the conventional method shows an upward trend with the increase of ΔT, while the method in the embodiment does not change much with ΔT. The reason may be that for the compensation of the vertical amplitude of the impedance, the related art only relies on mean adjustment and standardization to compensate the impedance after temperature change, which is equivalent to the same vertical amplitude compensation for all frequency points.

However, it was observed in the experiment of second embodiment that the impedance amplitude deviation at different frequencies caused by temperature changes is different. In addition, as the temperature difference gradually increases, this amplitude deviation will continue to increase. Therefore, the compensation relative error of the related art will increase with the increase of the temperature difference. In contrast, the method proposed in the present application performs frequency-dependent amplitude compensation on impedance signals based on the temperature deviation coefficient. When the temperature difference increases and thus causes the amplitude deviation of impedance signals of different frequencies to increase, the method of the present application can still achieve appropriate numerical compensation. It can be seen that compared to the related art, the automated temperature compensation method proposed in the present application has a more stable temperature compensation performance, whether it changes over time or with temperature difference.

Figure 8:
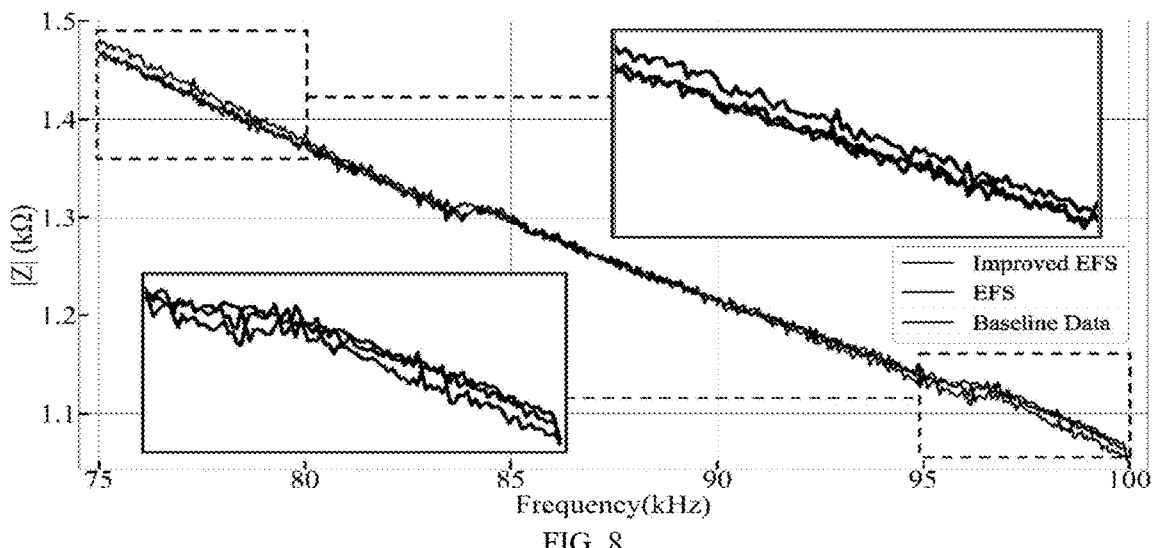
FIG. 8 is a schematic diagram of a comparison of compensation effects according to an embodiment of the present application.

In addition, in order to intuitively compare the difference in compensation effect, we visually compare the compensation effects of the two methods at 12-5-10:10 (5.3° C.) in FIG. 7. At this moment, the compensation error of the related art is 0.498% and the compensation error of the automated temperature compensation method proposed in the present application is 0.271%. The comparison of compensation effects is shown in FIG. 8. Compared with the related art, the automated temperature compensation method proposed in the present application can measure an impedance signal that is more consistent with the reference signal and well retains the characteristics of the impedance signal (resonance peak) without structural damage changes.

(2) Damage Identification Performance Improvement Test

Figure 9A:
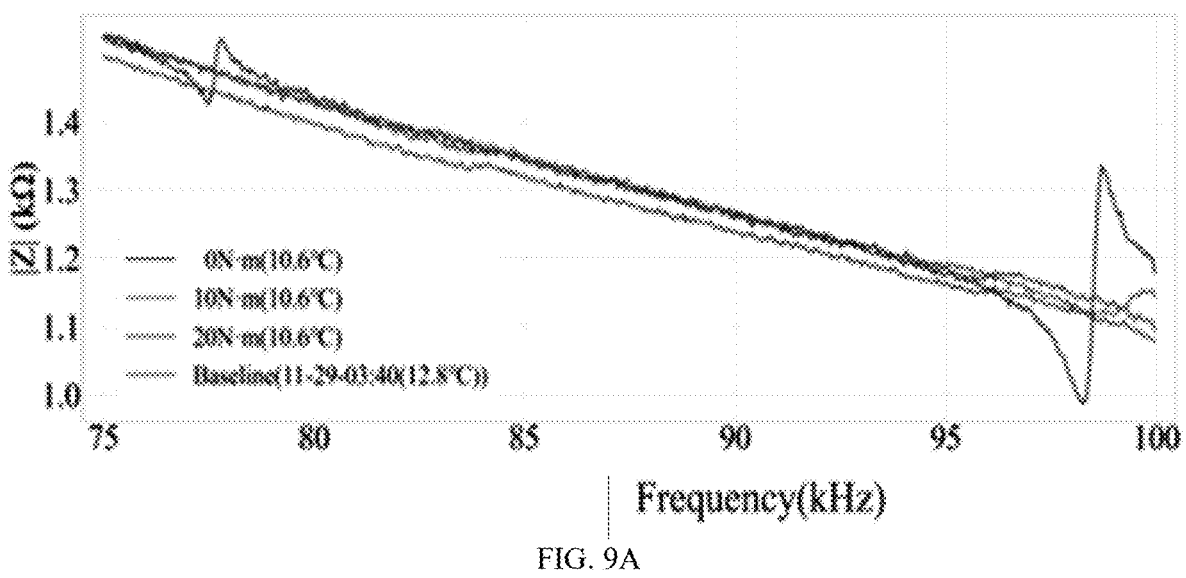
FIG. 9A is a schematic diagram of compensation effect under a working condition of 10.6° C. according to an embodiment of the present application.
Figure 9B:
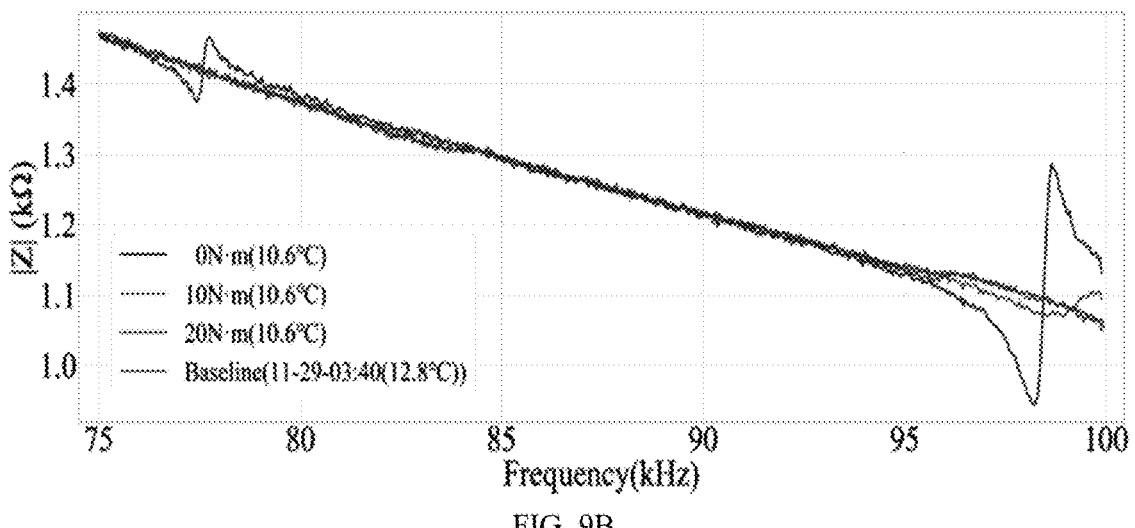
FIG. 9B is a schematic diagram of the compensation effect under the working condition of 10.6° C. according to an embodiment of the present application.

In order to test the improvement effect of the automated temperature compensation method on damage identification performance under temperature change environment, a damage identification and monitoring test based on temperature compensation was conducted during the period of large temperature change on the 11th day (12-10 20:40 to 12-11 00:30). During the test, a torque wrench was used to apply 0N·m, 10N·m and 20N·m bolt loosening damage to the monitored bolts of the flange structure under temperature conditions of 10.6° C., 9.6° C., 8.5° C., 7.4° C., and 6.5° C., respectively, and the developed system was used to collect the corresponding impedance signals, and then the imped- ance signals were temperature compensated by using the automated temperature compensation method proposed in the present application and the related art. In order to demonstrate the compensation effect intuitively, we visual- ized the compensation effect of one of the working condi- tions (10.6° C.), as shown in FIG. 9a and FIG. 9b. By comparing the impedance signals before and after compen- sation, it can be seen that the method proposed in the present application can effectively eliminate the temperature effect in the impedance signal and well preserve the damage characteristics in the signal, such as the resonance peak between 95 kHz and 100 kHz under the 0N·m condition.

Figure 10A:
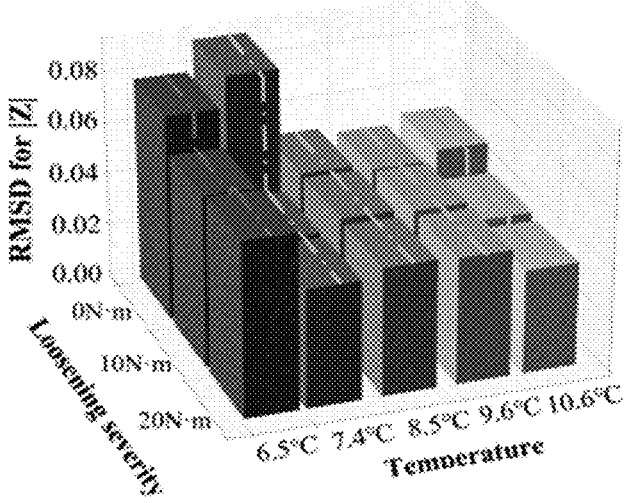
FIG. 10A is a schematic diagram of a root mean square deviation (RMSD) result calculated for an original data (uncompensated).
Figure 10B:
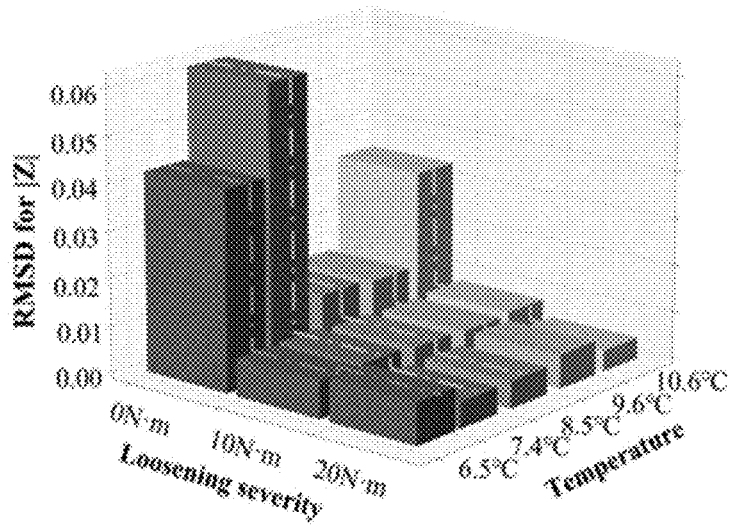
FIG. 10B is a schematic diagram of the RMSD result calculated for the data after temperature compensation by using the related art.
Figure 10C:
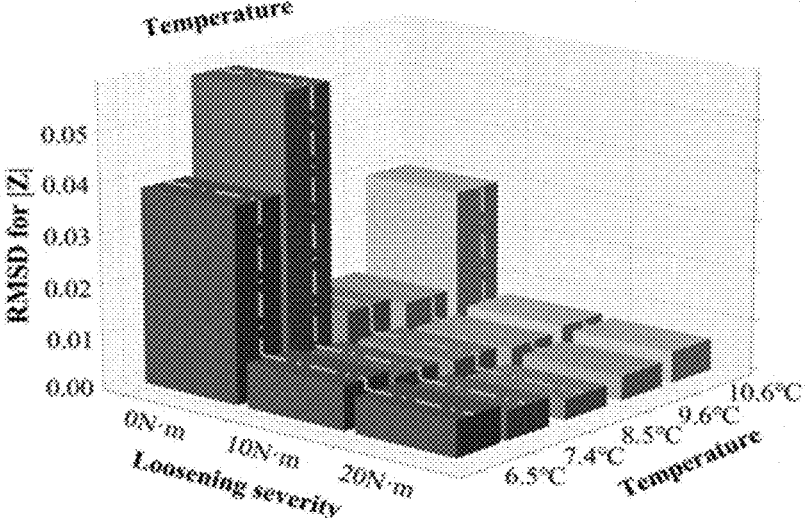
FIG. 10C is a schematic diagram of the RMSD result calculated for the data after temperature compensation according to the automated temperature compensation method.

Then, taking the benchmark data (11-29 03:40,12.8° C.) as a reference, the RMSD values of different loose damages under various temperature conditions are calculated for the impedance curve without temperature compensation, the impedance curve by using the related art for temperature compensation, and the impedance curve compensated by the automated temperature compensation method proposed in the present application. The calculation results are shown in FIGS. 10a to 10c. FIG. 10a is the RMSD result calculated for the original data (uncompensated), FIG. 10b is the RMSD result calculated for the data after temperature com- pensation by using the related art, and FIG. 10c is the RMSD result calculated for the data after temperature compensation according to the automated temperature compensation method proposed in the present application. The dotted line in the figure is the RMSD change trajectory line. The blue line indicates that the change in the torque of the measured bolt can be effectively identified by the change in the RMSD value, that is, the RMSD value gradually decreases with the increase of the torque. The yellow line indicates that the impedance signal change caused by the torque change is submerged in the influence of temperature, and the RMSD cannot reveal the change in the bolt torque. The red line indicates that RMSD incorrectly identifies the torque change, which is affected by temperature, and thus the numerical change of RMSD is inconsistent with the change law of torque looseness.

As shown in FIG. 10a, only under the 10.6° C. working condition which is closest to the reference working condi- tion (12.8° C.), the impedance signal without temperature compensation can effectively identify the bolt torque change. Under the other temperature conditions (9.6° C., 8.5° C., 7.4° C. working conditions), as the temperature difference increases, the damage information in the imped- ance signal is gradually submerged in the influence of temperature and even produces an erroneous identification (6.5° C.). As can be seen from FIG. 10b, the impedance signal after temperature compensation by the related art can identify the change of bolt torque under the interference of temperature under the temperature conditions of 10.6° C., 9.6° C., 8.5° C., and 7.4° C. However, under the 6.5° C. working condition with the largest temperature difference from the reference working condition (12.8° C.), the iden- tification of torque change is wrong. This shows that the related art can eliminate the interference of temperature to a certain extent, but the temperature compensation effect of this method will gradually decay with the increase of the temperature difference. As shown in FIG. 10c, the imped- ance data after temperature compensation by the automated temperature compensation method proposed in the present application can effectively identify the change of bolt torque through the numerical change of RMSD under various temperature conditions. The comparative test results show that the automated temperature compensation method pro- posed in the present application has a wider range of application and can effectively improve the damage identi- fication performance of piezoresistive impedance technol- ogy in temperature change environment monitoring appli- cations.

Second Embodiment

Figure 11:
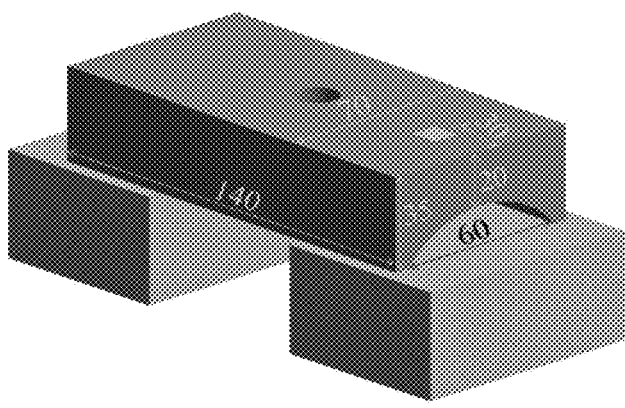
FIG. 11 is a schematic diagram of an iron block specimen according to an embodiment of the present application.

In the embodiment, a high temperature control test is conducted on an iron block specimen shown in FIG. 11, and the variation law of the impedance signal under the tem- perature effect is analyzed to verify the rationality of the improvement of the automated temperature compensation method. The impedance sweep frequency range is 75 kHz~100 kHz, the temperature test range is 26° C.~56° C., and the impedance of the iron block specimen is collected at every 2° C. interval. To ensure that the specimen tempera- ture is consistent with the ambient temperature, a high- precision temperature recorder (TH40W) is used to monitor the temperature of the structure, and the impedance data is collected after the temperature stabilizes for 12 minutes.

Figure 12A:
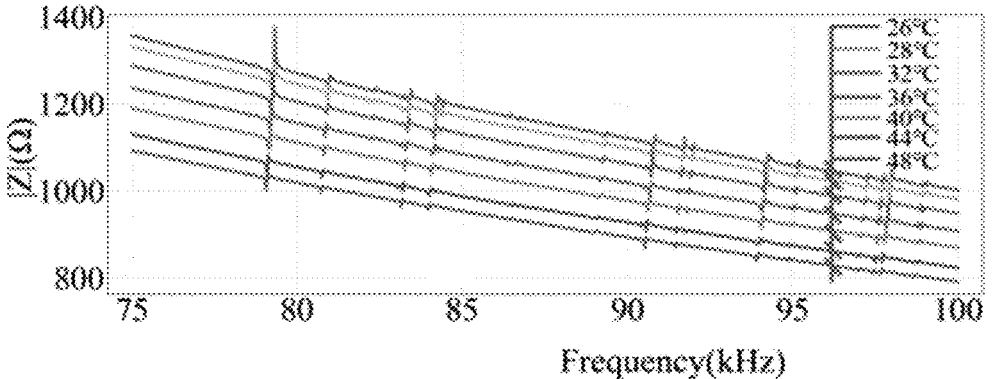
FIG. 12A is a schematic diagram of an impedance signal collected by performing impedance measurement according to an embodiment of the present application.

The impedance signal collected by performing impedance measurement is shown in FIG. 12a. As the temperature rises, the impedance signal produces a frequency shift to the left in the horizontal direction and a downward amplitude devia- tion in the vertical direction. Moreover, as the temperature difference gradually increases, the values of the frequency shift and amplitude deviation gradually increase.

Figure 12B:
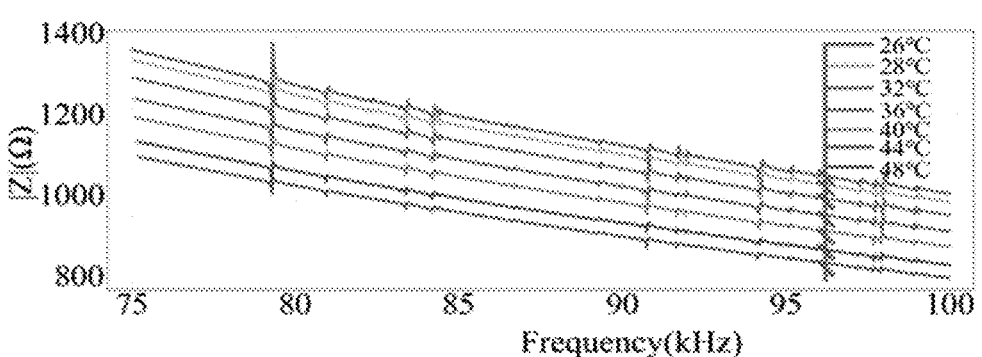
FIG. 12B is a schematic diagram of a result of a horizontal frequency shift compensation performed on the impedance signal based on a maximum correlation coefficient.

The impedance signal collected at 26° C. was used as the reference signal, and the horizontal frequency shift compen- sation was performed on the impedance signal based on the maximum correlation coefficient. The result is shown in FIG. 12b. Furthermore, the signal was mean-adjusted by using the related art, and the result is shown in FIG. 12c.

Figure 12C:
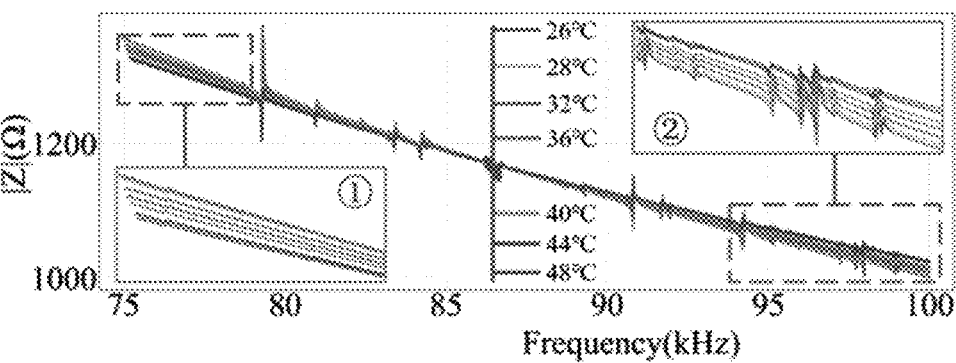
FIG. 12C is a schematic diagram of a comparison result between the impedance signal and the reference signal after equal amplitude compensation.

As shown in FIG. 12c, the impedance signal and the reference signal after equal amplitude compensation still have amplitude deviations of different values at different frequencies, and the greater the temperature change, the greater the amplitude deviation. This phenomenon shows that the related art still needs to compensate for the fre- quency difference of amplitude deviation after the mean adjustment.

In the embodiment, an automated temperature compen- sation apparatus is also provided. The term "module" can implement a combination of software and/or hardware of a predetermined function. Although the devices described in the following embodiments are implemented in software, the implementation of hardware, or a combination of soft- ware and hardware, is also possible and conceivable.

Figure 13:
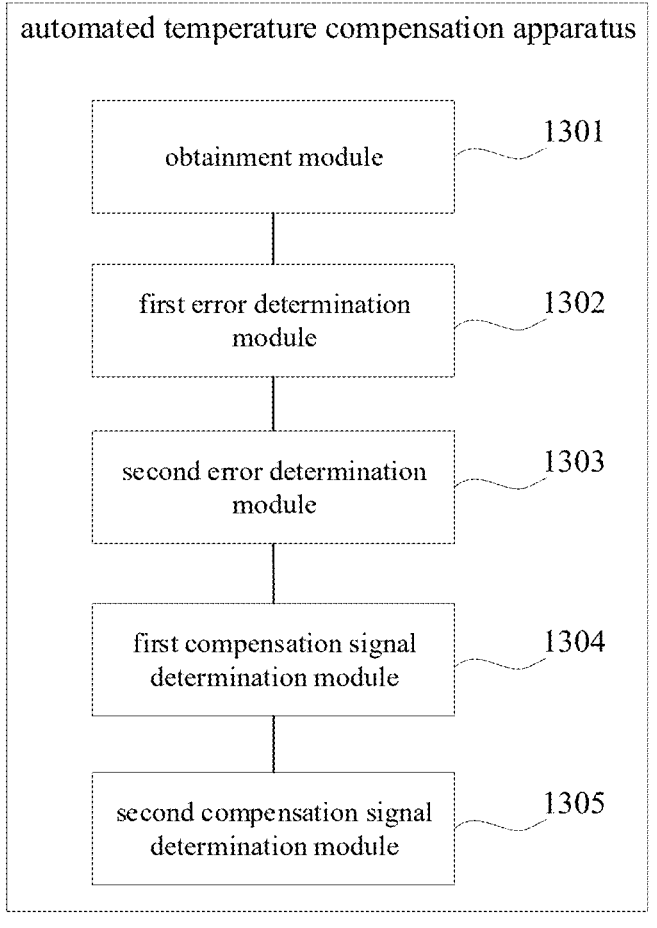
FIG. 13 is a schematic diagram of an automated temperature compensation apparatus according to an embodiment of the present application.

The embodiment provides an automated temperature compensation apparatus, as shown in FIG. 13, including: an obtainment module 1301, a first error determination module 1302, a second error determination module 1303, a first compensation signal determination module 1304, and a second compensation signal determination module 1305.

The obtainment module 1301 is configured to obtain an impedance signal set collected from at least one position of the object to be measured.

The first error determination module 1302 is configured to determine n error values corresponding to a first impedance signal according to the first impedance signal, n preset offsets, and a pre-obtained reference signal, the first impedance signal is any one of the impedance signal sets collected from the at least one position.

The second error determination module 1303 is configured to determine a final error value according to the n error values and a preset standard.

The first compensation signal determination module 1304 is configured to determine a horizontal compensation impedance signal according to an offset corresponding to the final error value and the first impedance signal.

The second compensation signal determination module 1305 is configured to determine a vertical compensation impedance signal according to the reference signal, the horizontal compensation impedance signal and a temperature deviation coefficient, the temperature deviation coefficient is calculated according to the reference signal and the first impedance signal.

In an embodiment, the apparatus is also configured to: calculate a root mean square deviation between at least one vertical compensation impedance signal and a reference signal; and in response to that the mean square error value of the vertical compensation impedance signal does not meet a preset condition, determine the position of the corresponding vertical compensation impedance signal to be the damage position.

In an embodiment, the apparatus is further configured to: continuously obtain the impedance signal at the damage position; and continuously monitor the damage position according to the impedance signal at the damage position.

In an embodiment, the first impedance signal and the reference signal both include m frequency points, and the first error determination module specifically includes:

an offset unit, configured to determine a second impedance signal according to the first impedance signal and a first offset, the first offset is any one of the n preset offsets;

a first statistical unit, configured to determine a first statistical parameter of the second impedance signal according to each frequency point in the second impedance signal;

a second statistical unit, configured to determine a second statistical parameter of the reference signal according to each frequency point in the reference signal; and an error unit, configured to determine a first error value according to the i-th frequency point impedance signal corresponding to the second impedance signal, the i-th frequency point impedance signal corresponding to the reference signal, the first statistical parameter and second statistical parameter.

In an embodiment, the first statistical parameter includes a first mean value and a first standard deviation, and the second statistical parameter includes a second mean value and a second standard deviation.

In an embodiment, the second compensation signal determination module specifically includes:

an impedance change determining unit, configured to determine an impedance change value according to the first mean value and the second mean value;

a vertical compensation unit, configured to determine the vertical compensation impedance signal according to the reference signal, the first mean value, the horizontal compensation impedance signal, the impedance change value and the temperature deviation coefficient;

the temperature deviation coefficient in the vertical compensation unit is determined according to the following steps:

determining an initial temperature deviation coefficient according to the reference signal, the horizontal compensation impedance signal, and a quantity of frequency points; and optimizing the initial temperature deviation coefficient to determine the temperature deviation coefficient.

In an embodiment, the second compensation signal determination module further includes:

a random number determination subunit, configured to determine a first temperature deviation coefficient and a second temperature deviation coefficient according to the initial temperature deviation coefficient, a first preset random number, and a second preset random number, the first temperature deviation coefficient is less than the initial temperature deviation coefficient and less than the second temperature deviation coefficient, and the first preset random number is less than the second preset random number;

an error determination subunit, configured to respectively determine a first relative error value corresponding to the initial temperature deviation coefficient, a second relative error value corresponding to the first temperature deviation coefficient, and a third relative error value corresponding to the second temperature deviation coefficient;

a first gradient determining subunit, configured to determine a first gradient value according to the first relative error value, the second relative error value, and the first preset random number;

a second gradient determining subunit, configured to determine a second gradient value according to the second relative error value, the third relative error value, and the second preset random number; and a coefficient determination unit, configured to perform iterative optimization according to the first gradient value and the second gradient value to determine the temperature deviation coefficient.

In an embodiment, the coefficient determination unit is specifically configured to: in response to that the first gradient is greater than zero and the second gradient is less than zero, shift the initial temperature deviation coefficient to the right of the numerical axis until the second gradient is greater than zero, and determine the temperature deviation coefficient according to the initial temperature deviation coefficient and a first value of the right shift; or in response to that the first gradient is less than zero and the second gradient is greater than zero, shift the initial temperature deviation coefficient to the left of the numerical axis until the first gradient is greater than zero, and determine the temperature deviation coefficient according to the initial temperature deviation coefficient and a first value of the left shift; or in response to that the first gradient is greater than zero and the second gradient is greater than zero, and in response to that an absolute value of the first gradient is less than an absolute value of the second gradient, shift the initial temperature deviation coefficient to the left of the number axis after update the first preset random number until the second gradient is less than zero, and determine the temperature deviation coefficient according to the initial temperature deviation coefficient and a second value of the left shift; or in response to that the first gradient is greater than zero and the second gradient is greater than zero, and in response to that the absolute value of the first gradient is greater than the absolute value of the second gradient, shift the initial temperature deviation coefficient to the right of the number axis after update the first preset random number until the second gradient is less than zero, and determine the temperature deviation coefficient according to the initial temperature deviation coefficient and a second value of the right shift.

The further functional description of each of the above modules and units is the same as that of the above corresponding embodiments and will not be repeated here.

The automated temperature compensation apparatus in the embodiment is presented in the form of a functional unit, where the unit refers to an Application Specific Integrated Circuit (ASIC) circuit, the ASIC circuit includes a processor, memory and/or other devices that can provide the above functions, and the processor can execute one or more software or fixed programs.

The present application also provides an electronic device, the electronic device includes the automated temperature compensation apparatus as described in the above embodiments.

Figure 14:
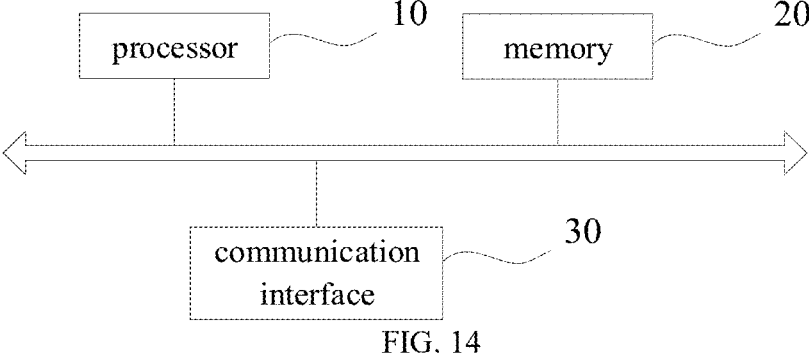
FIG. 14 is a structural schematic diagram of an electronic device according to an embodiment of the present application.

As shown in FIG. 14, which is a structural schematic diagram of an electronic device provided by some embodiments of the present application. As shown in FIG. 14, the electronic device includes: one or more processors 10, a memory 20, and interfaces for connecting various components, including high-speed interfaces and low-speed interfaces. The various components are connected to each other by using different buses for communication, and can be installed on a common motherboard or installed in other ways as needed. The processor can process instructions executed in the electronic device, including instructions stored in or on the memory to display graphical information of the graphical user interface (GUI) on an external input/output device (such as a display device coupled to the interface). In an embodiment, if necessary, multiple processors and/or multiple buses can be used together with multiple memories and multiple memories. Similarly, multiple electronic devices can be connected, and each device provides some necessary operations (for example, as a server array, a group of blade servers, or a multi-processor system). As shown in FIG. 14, a processor 10 is taken as an example.

The processor 10 may be a central processing unit, a network processor or a combination thereof. The processor 10 may further include a hardware chip. The hardware chip may be a dedicated integrated circuit, a programmable logic or a combination thereof. The programmable logic may be a complex programmable logic, a field programmable gate array, a general purpose array logic or any combination thereof.

The memory 20 stores instructions executable by at least one processor 10, so that at least one processor 10 executes the method described in the above embodiment.

The memory 20 may include a program storage area and a data storage area, the program storage area may store an operating system, an application required for at least one function; the data storage area may store data created according to the use of the electronic device, etc. In addition, the memory 20 may include a high-speed random access memory, and may also include a non-transient memory, such as at least one disk storage device, a flash memory device, or other non-transient solid-state storage device. In an embodiment, the memory 20 may include a memory remotely arranged relative to the processor 10, and these remote memories may be connected to the electronic device via a network. The above-mentioned network include, but are not limited to, the Internet, an intranet, a local area network, a mobile communication network, and combinations thereof.

The memory 20 may include a volatile memory, such as a random access memory; the memory may also include a non-volatile memory, such as a flash memory, a hard disk or a solid state drive; the memory 20 may also include a combination of the above types of memory.

The electronic device further includes a communication interface 30 for the electronic device to communicate with other devices or a communication network.

The present application also provides a computer-readable storage medium. The above method according to the embodiment of the present application can be implemented in hardware, firmware, or implemented as a computer code that can be recorded in a storage medium, or is implemented as a computer code that is originally stored in a remote storage medium or a non-temporary machine-readable storage medium and will be stored in a local storage medium and downloaded through a network, so that the method described herein can be stored in such software processing on a storage medium by using a general-purpose computer, a dedicated processor, or programmable or dedicated hardware. The storage medium can be a magnetic disk, an optical disk, a read-only storage memory, a random access memory, a flash memory, a hard disk or a solid-state hard disk, etc.; further, the storage medium can also include a combination of the above types of memories. It can be understood that a computer, a processor, a microprocessor controller, or programmable hardware includes a storage component that can store or receive software or computer code. When the software or computer code is accessed and executed by a computer, a processor, or hardware, the method shown in the above embodiment is implemented.

The embodiments of the present application are described in conjunction with the accompanying drawings, those skilled in the art may make various modifications and variations without departing from the spirit and scope of the present application, and such modifications and variations are all within the scope defined by the appended claims.

What is claimed is:

1. An automated temperature compensation method, comprising:

obtaining an impedance signal set collected from at least one position of an object to be measured; wherein the object to be measured is a structure in practical engineering that requires monitoring of safety and damage state changes;

determining n error values corresponding to a first impedance signal according to the first impedance signal, n preset offsets and a pre-obtained reference signal, wherein the first impedance signal is any one of signals in the impedance signal set collected from the at least one position;

determining a final error value according to the n error values and a preset standard;

determining a horizontal compensation impedance signal according to an offset corresponding to the final error value and the first impedance signal;

determining a vertical compensation impedance signal according to the reference signal, the horizontal compensation impedance signal and a temperature deviation coefficient, wherein the temperature deviation coefficient is calculated according to the reference signal and the first impedance signal;

calculating a root mean square deviation between at least one vertical compensation impedance signal and a reference signal;

in response to that the root mean square deviation value of the vertical compensation impedance signal does not meet a preset condition, determining a position of a corresponding vertical compensation impedance signal to be a damage position of the object to be measured;

continuously obtaining the impedance signal at the damage position; and continuously monitoring the damage position according to the impedance signal at the damage position.

2. A computer device, comprising:

a memory; and a processor, wherein the memory and the processor are communicatively connected, the memory stores computer instructions, the computer instructions when executed by the processor, implements the steps of the automated temperature compensation method according to claim 1.

3. A non-transitory computer-readable storage medium, wherein the computer-readable storage medium stores computer instructions, and the computer instructions are configured such that the automated temperature compensation method according to claim 1 is executed by a computer.

4. The method according to claim 1, wherein the first impedance signal and the reference signal both comprise m frequency points, and the determining the n error values corresponding to the first impedance signal according to the first impedance signal, the n preset offsets and the pre-obtained reference signal comprises:

determining a second impedance signal according to the first impedance signal and a first offset, wherein the first offset is any one of the n preset offsets;

determining a first statistical parameter of the second impedance signal according to each frequency point in the second impedance signal;

determining a second statistical parameter of the reference signal according to each frequency point in the reference signal; and determining a first error value according to an i-th frequency point impedance signal corresponding to the second impedance signal, an i-th frequency point impedance signal corresponding to the reference signal, the first statistical parameter, and the second statistical parameter.

5. The method according to claim 4, wherein the first statistical parameter comprises a first mean value and a first standard deviation, and the second statistical parameter comprises a second mean value and a second standard deviation.

6. The method according to claim 5, wherein the determining the vertical compensation impedance signal according to the reference signal, the horizontal compensation impedance signal and the temperature deviation coefficient comprises:

determining an impedance change value according to the first mean value and the second mean value;

determining the vertical compensation impedance signal according to the reference signal, the first mean value, the horizontal compensation impedance signal, the impedance change value and the temperature deviation coefficient;

a step of determining the temperature deviation coefficient comprises:

determining an initial temperature deviation coefficient according to the reference signal, the horizontal compensation impedance signal, and a quantity of the frequency points; and optimizing the initial temperature deviation coefficient to determine the temperature deviation coefficient.

7. The method according to claim 6, wherein the step of optimizing the initial temperature deviation coefficient to determine the temperature deviation coefficient comprises:

determining a first temperature deviation coefficient and a second temperature deviation coefficient according to the initial temperature deviation coefficient, a first preset random number, and a second preset random number, wherein the first temperature deviation coefficient is less than the initial temperature deviation coefficient, the initial temperature deviation coefficient is less than the second temperature deviation coefficient, and the first preset random number is less than the second preset random number;

respectively determining a first relative error value corresponding to the initial temperature deviation coefficient, a second relative error value corresponding to the first temperature deviation coefficient, and a third relative error value corresponding to the second temperature deviation coefficient;

determining a first gradient value according to the first relative error value, the second relative error value, and the first preset random number;

determining a second gradient value according to the second relative error value, the third relative error value, and the second preset random number; and performing an iterative optimization according to the first gradient value and the second gradient value to determine the temperature deviation coefficient.

8. The method according to claim 7, wherein the performing the iterative optimization according to the first gradient value and the second gradient value to determine the temperature deviation coefficient comprises:

in response to that the first gradient is greater than zero and the second gradient is less than zero, shifting the initial temperature deviation coefficient to a right of a numerical axis until the second gradient is greater than zero, and determining the temperature deviation coefficient according to the initial temperature deviation coefficient and a first value of the right shift; or in response to that the first gradient is less than zero and the second gradient is greater than zero, shifting the initial temperature deviation coefficient to a left of the numerical axis until the first gradient is greater than zero, and determining the temperature deviation coefficient according to the initial temperature deviation coefficient and a first value of the left shift; or in response to that the first gradient is greater than zero and the second gradient is greater than zero, and in response to that an absolute value of the first gradient is less than an absolute value of the second gradient, shifting the initial temperature deviation coefficient to the left of the number axis after updating the first preset random number until the second gradient is less than zero, and determining the temperature deviation coefficient according to the initial temperature deviation coefficient and a second value of the left shift; or in response to that the first gradient is greater than zero and the second gradient is greater than zero, and in response to that the absolute value of the first gradient is greater than the absolute value of the second gradient, shifting the initial temperature deviation coefficient to the right of the number axis after updating the first preset random number until the second gradient is less than zero, and determining the temperature deviation coefficient according to the initial temperature deviation coefficient and a second value of the right shift.

9. An automated temperature compensation apparatus, the apparatus comprising:

an obtainment module, configured to obtain an impedance signal set collected from at least one position of the object to be measured; wherein the object to be measured is a structure in practical engineering that requires monitoring of safety and damage state changes;

a first error determination module, configured to determine n error values corresponding to a first impedance signal according to the first impedance signal, n preset offsets, and a pre-obtained reference signal, wherein the first impedance signal is any one of the impedance signal sets collected from the at least one position;

a second error determination module, configured to determine a final error value according to the n error values and a preset standard;

a first compensation signal determination module, configured to determine a horizontal compensation impedance signal according to an offset corresponding to the final error value and the first impedance signal;

a second compensation signal determination module, configured to determine a vertical compensation impedance signal according to the reference signal, the horizontal compensation impedance signal and a temperature deviation coefficient, wherein the temperature deviation coefficient is calculated according to the reference signal and the first impedance signal;

a damage position determination module, configured to calculate a root mean square deviation between at least one vertical compensation impedance signal and a reference signal; in response to that the root mean square deviation value of the vertical compensation impedance signal does not meet a preset condition, determine a position of a corresponding vertical compensation impedance signal to be a damage position of the object to be measured; and a continuous monitoring module, configured to continuously monitor the damage position according to the impedance signal at the damage position; and continuously monitor the damage position according to the impedance signal at the damage position.

* * * * *